United States Patent
Mehta et al.

(10) Patent No.: US 9,467,304 B2
(45) Date of Patent: Oct. 11, 2016

(54) 128 GIGABIT FIBRE CHANNEL SPEED NEGOTIATION

(71) Applicant: Brocade Communications Systems, Inc., San Jose, CA (US)

(72) Inventors: Anil Mehta, Milpitas, CA (US); Scott Kipp, Santa Barbara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 10 days.

(21) Appl. No.: 14/501,803

(22) Filed: Sep. 30, 2014

(65) Prior Publication Data

US 2015/0098343 A1  Apr. 9, 2015

Related U.S. Application Data

(60) Provisional application No. 61/886,750, filed on Oct. 4, 2013, provisional application No. 61/909,042, filed on Nov. 26, 2013.

(51) Int. Cl.
*H04L 12/40* (2006.01)
*H04L 12/24* (2006.01)
*H04L 12/931* (2013.01)

(52) U.S. Cl.
CPC ....... *H04L 12/4013* (2013.01); *H04L 41/0816* (2013.01); *H04L 49/357* (2013.01); *H04L 41/0681* (2013.01); *H04L 41/0803* (2013.01); *H04L 41/0896* (2013.01)

(58) Field of Classification Search
CPC ............. H04L 12/4013; H04L 49/357; H04L 41/0681; H04L 41/0803; H04L 41/0896
See application file for complete search history.

(56) References Cited

U.S. PATENT DOCUMENTS

| | | | |
|---|---|---|---|
| 8,005,105 B2 | 8/2011 | Dropps et al. | |
| 9,172,661 B1* | 10/2015 | Dropps | ................ H04L 49/352 |
| 2007/0081463 A1 | 4/2007 | Bohra et al. | |
| 2007/0206947 A1* | 9/2007 | Natarajan | ........... H04J 14/0227 398/25 |
| 2010/0229071 A1* | 9/2010 | Ganga | ................... H03M 13/05 714/776 |
| 2011/0090804 A1* | 4/2011 | Wusirika | ............ H04L 41/0806 370/252 |
| 2011/0264968 A1* | 10/2011 | Shilo | ................... G06F 11/0745 714/704 |
| 2014/0270755 A1* | 9/2014 | Schmitz | ............. H04B 10/0795 398/26 |
| 2015/0050028 A1* | 2/2015 | Budd | ..................... H04B 10/40 398/135 |

OTHER PUBLICATIONS

M. Blair and D. Lytle, Buzz Fibrechannel—To 16G and Beyond, Feb. 7, 2013, SHARE San Francisco 2013, Session 13012.*

*Primary Examiner* — Chi H Pham
*Assistant Examiner* — Shailendra Kumar
(74) *Attorney, Agent, or Firm* — Blank Rome, LLP

(57) ABSTRACT

The FC port state machine enhanced by determining if various lanes are configured to be operated in 128 Gbps mode by operating as parallel lanes as indicated by using a reserved bit in a link training field. If so and if all of the ports are 32 Gbps ports and pass training, then four lanes can be combined to form a 128 Gbps link. If the ports are configured for 128 Gbps only operation and at least one lane does not negotiate to 32 Gbps or fails training, the link is not activated and none of the lanes are activated. If the ports are configured to do either 128 Gbps or independent operation and at least one lane cannot operate at 128 Gbps, then the lanes operate independently at the negotiated and trained speed. If the lanes are configured for only independent operation the transceiver develops independent links as negotiated.

18 Claims, 10 Drawing Sheets

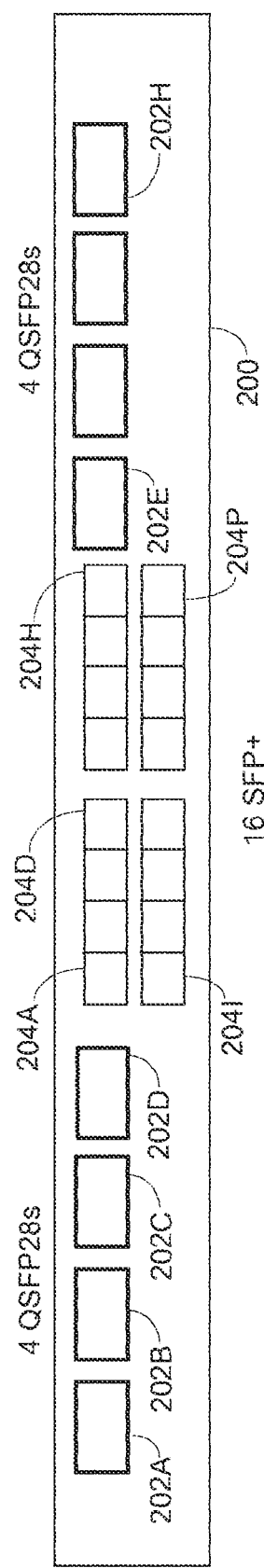
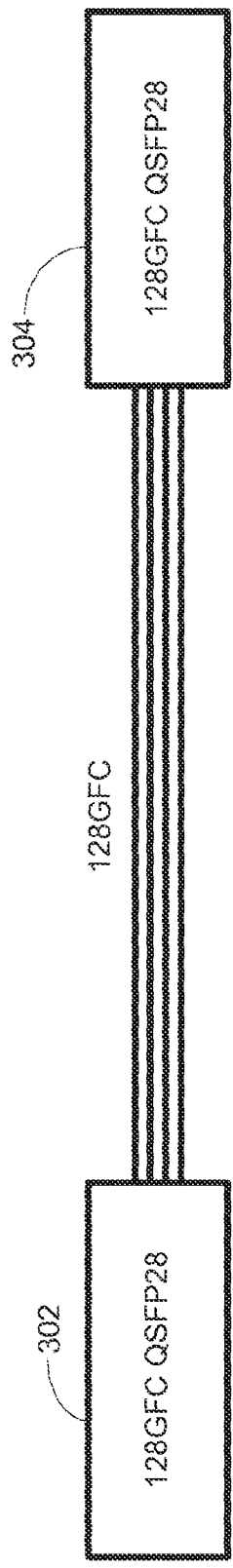

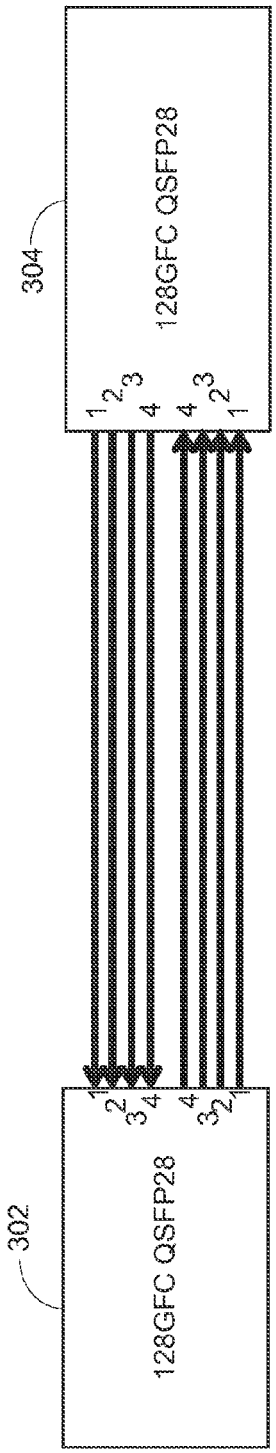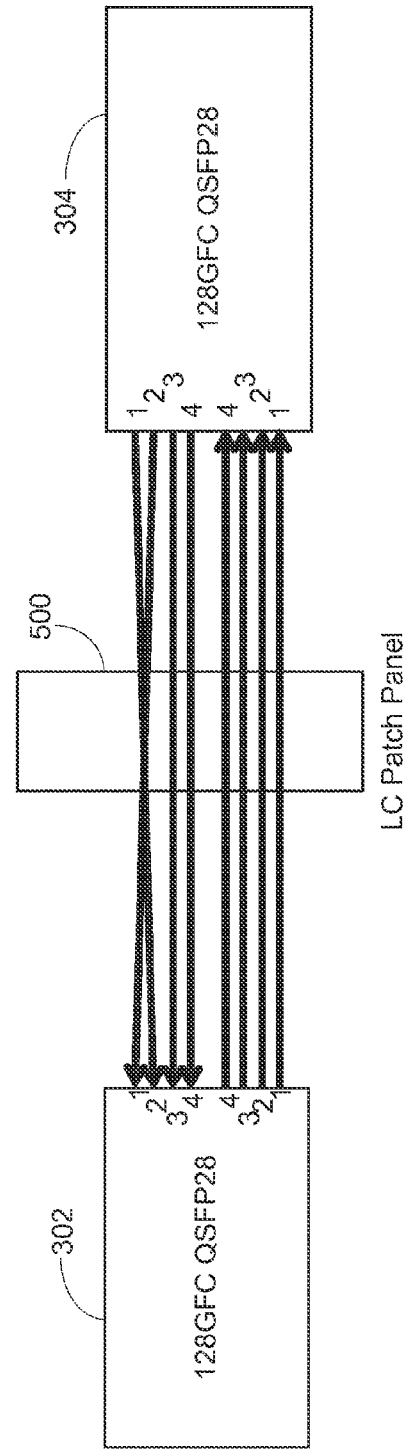

FC-FS-3 Port State Machine

| Bits | Field Name | Content |
| --- | --- | --- |
| 15-14 | Extended Marker | Set to 11b: Extended Marker for 32GFC<br>Set to 10b: reserved<br>Set to 01b: reserved<br>Set to 00b: reserved |
| 13 | Preset | Set to one: the transmitter should set all coefficients to preset values.<br>Set to zero: no transmitter action advised. |
| 12 | Initialize | Set to one: the transmitter should set all coefficients to initialize values.<br>Set to zero: no transmitter action advised. |
| 11 | FECReq | Set to one: the FC_Port is requesting use of Forward Error Correction (FEC) (See 5.3) in association with 64B/66B.<br>Set to zero: the FC_Port is directing not to use Forward Error Correction (FEC) in association with 64B/66B. |
| 10 | Parallel lane support | Set to one: parallel lanes are supported.<br>Set to zero: single lane is supported. |
| 9-6 | Reserved | Reserved |
| 5-4 | C1Upd | Set to 11b: reserved<br>Set to 10b: transmitter should decrement coefficient 1 one step.<br>Set to 01b: transmitter should increment coefficient 1 one step.<br>Set to 00b: transmitter should not change coefficient 1. |
| 3-2 | C0Upd | Set to 11b: reserved<br>Set to 10b: transmitter should decrement coefficient 0 one step.<br>Set to 01b: transmitter should increment coefficient 0 one step.<br>Set to 00b: transmitter should not change coefficient 0. |
| 1-0 | C-1Upd | Set to 11b: Extended Marker for 32GFC<br>Set to 10b: transmitter should decrement coefficient -1 one step.<br>Set to 01b: transmitter should increment coefficient -1 one step.<br>Set to 00b: transmitter should not change coefficient -1. |

Fig. 11

128 GIGABIT FIBRE CHANNEL SPEED NEGOTIATION

CROSS REFERENCE TO RELATED APPLICATIONS

This application claims the benefit under 35 U.S.C. §119 (e) of U.S. Provisional Patent Applications Ser. Nos. 61/886,750 entitled "128 GFCP Architecture," filed Oct. 4, 2013 and 61/909,042 entitled "128 GFC Speed Negotiation Topics," filed Nov. 26, 2013, which are all hereby incorporated by reference.

This application is related to U.S. patent application Ser. No. 14/308,143 entitled "128 Gigabit Fibre Channel Physical Architecture," filed Jun. 18, 2014, which is hereby incorporated by reference.

BACKGROUND OF THE INVENTION

1. Field of the Invention

The invention relates to the physical layer of high speed networking.

2. Description of the Related Art

Speeds of network links are ever increasing. Today Ethernet speeds of 40 and 100 Gigabits per second (Gbps) are available, though at a very high cost. Fibre Channel (FC) speeds of 16 Gbps are available and 32 Gbps devices are in development. To continue widespread use of Fibre Channel, the next speed generation, 128 Gbps, must be developed. Therefore it is desirable to advance Fibre Channel to the next speed generation but still provide flexibility in operation.

SUMMARY OF THE INVENTION

According to the embodiments of the present invention the FC port state machine is enhanced to determine if the various lanes of a quad or four lane transceiver are configured to be operated in 128 Gbps mode by operating as parallel lanes. If so and if all of the ports are 32 Gbps ports and pass training, if so configured, then four lanes can be combined to form a 128 Gbps link. If the ports are configured for 128 Gbps only operation and at least one lane does not negotiate to 32 Gbps or fails training, if so configured, then the port or link is not activated and none of the lanes are activated. If the ports or lanes are configured to do either 128 Gbps or independent operation and at least one lane cannot operate at 128 Gbps, then the ports or lanes operate independently at the negotiated speed. If the lanes are configured for only independent operation, not parallel lane operation, then the transceiver develops independent links as negotiated by the ports. Parallel lane operation is preferably indicated by using a formerly reserved bit in a field used during speed negotiation.

In other embodiments four individual 32 Gbps transceivers which are configured in parallel and connected properly to a switching chip inside the switch device, that is such that the switching chip can combine the four transceivers for proper striping and the like, than individual link transceivers can be used to develop a 128 Gbps link.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 2 is a front view of a Fibre Channel switch according to the present invention.

FIG. 3 is a block diagram of two interconnected transceivers according to the present invention.

FIG. 4 is a more detailed version of the block diagram of FIG. 3.

FIG. 5 is a block diagram of an alternative embodiment of FIG. 4.

FIG. 11 is a table illustrating a transmitter training signal control field according to the present invention.

DETAILED DESCRIPTION

Figure 1:
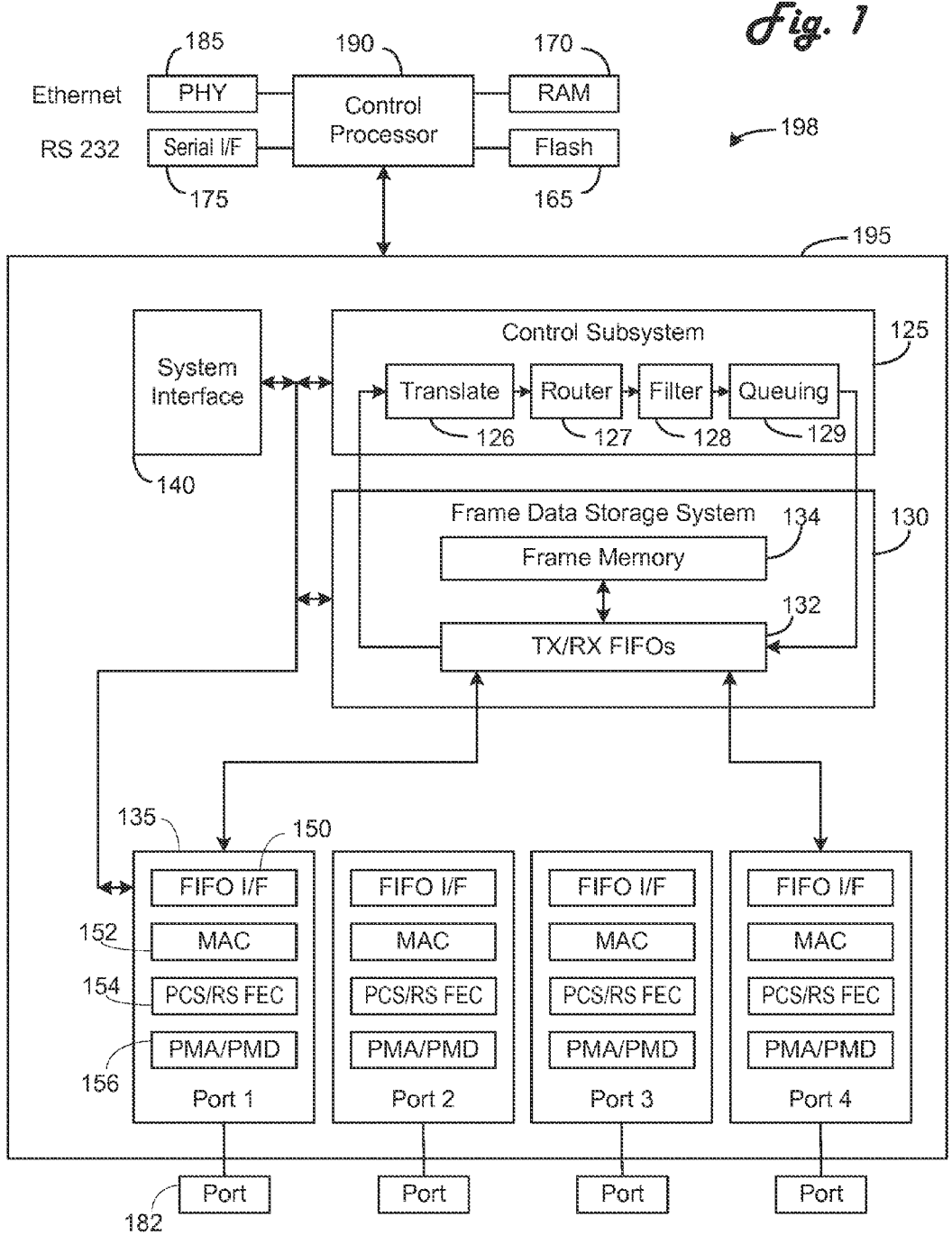
FIG. 1 is a block diagram of a Fibre Channel switch according to the present invention.

FIG. 1 is a block diagram of an exemplary 128 Gbps Fibre Channel (FC) switch 198 according to the present invention. A control processor 190 is connected to a switch ASIC 195. The switch ASIC 195 is connected to ports 182. Generally the control processor 190 configures the switch ASIC 195 and handles higher level switch operations, such as the name server, routing table setup, and the like. The switch ASIC 195 handles general high speed inline or in-band operations, such as switching, routing and frame translation. The control processor 190 is connected to flash memory 165 or the like to hold the software and programs for the higher level switch operations; to random access memory (RAM) 170 for working memory, such as the name server and router tables; and to an Ethernet PHY 185 and serial interface 175 for out-of-band management.

The switch ASIC 195 has four basic modules: port modules 135, a frame data storage system 130, a control subsystem 125 and a system interface 140. The port modules 135 perform the lowest level of packet transmission and reception. Generally, frames are received from a port 182 and provided to the frame data storage system 130. Further, frames are received from the frame data storage system 130 and provided to the port 182. The frame data storage system 130 includes a set of transmit/receive FIFOs 132, which interface with the port modules 135, and a frame memory 134, which stores the received frames and frames to be transmitted. The frame data storage system 130 provides initial portions of each frame, typically the frame header and a payload header for FCP frames, to the control subsystem 125. The control subsystem 125 has the translate 126, router 127, filter 128 and queuing 129 blocks. The translate block 126 examines the frame header and performs any necessary address translations. There can be various embodiments of the translation block 126, with examples of translation operation provided in U.S. Pat. No. 7,752,361 and U.S. Pat. No. 7,120,728, both of which are incorporated herein by reference in their entirety. Those examples also provide examples of the control/data path splitting of operations. The router block 127 examines the frame header and selects the desired output port for the frame. The filter block 128 examines the frame header, and the payload header in some cases, to determine if the frame should be transmitted. The queuing block 129 schedules the frames for transmission based on various factors including quality of service, priority and the like.

Each port module 135 includes a series of submodules. A FIFO interface submodule 150 provides the interface to the FIFOs 132. A MAC submodule 152 is connected to the FIFO interface 150. A combined PCS/FEC submodule 154 according to the present invention is connected to the MAC submodule 152. A PMA/PMD submodule 156 is connected to the PCS/FEC submodule 154 and the respective port 182.

This is an exemplary architecture and numerous other architectures as well known to those skilled in the art exist.

FIG. 2 is a front view of a 48 port Fibre Channel switch 200. The view indicates that there are two groups of four Quad (4-channel) Small Form-factor Pluggable (QSFP) 28 Gbps transceivers 202A-D and 202E-H. In the center are sixteen Small Form-factor Pluggable (SFP+) 16 Gbps transceivers 204A-P. Each QSFP 28 transceiver is capable of operating according to the 32 Gbps Fibre Channel standard as defined in FC-PI-6, Rev. 1.00, dated Apr. 26, 2013, which is hereby incorporated by reference, so that four 32 Gbps ports are provided in the QSFP 28 transceiver.

According to the present invention those four 32 Gbps ports can be combined to form a 128 Gbps port or link, as discussed in the related U.S. patent application Ser. No. 14/308,143 entitled "128 Gigabit Fibre Channel Physical Architecture." However, the four lanes cannot simply be placed in parallel and have reliable, interoperable 128 Gbps FC operation. Embodiments according to the present invention negotiate the 128 Gbps operation as described in more detail below.

In the preferred embodiments according to the present invention, each port or lane can be configured in one of three states, 128 Gbps only operation, no parallel lane or independent only operation and either of those two variants.

FIG. 3 illustrates the simplest variation, where two 128 Gbps QSFP 28 transceivers 302 and 304 are directly connected with four parallel lanes. FIG. 4 provides further details on the actual connections of the transceivers 302 and 304 of FIG. 3. According to the conventions of QSFP 28 transceivers, lanes 1-4 are defined as starting from the outer edge and going inward. Thus QSFP 28 transceiver 302 transmit lane 1 is connected to QSFP 28 transceiver 304 receive lane 1, QSFP 28 transceiver 302 transmit lane 2 is connected to QSFP 28 transceiver 304 receive lane 2, and so on. The embodiments of FIGS. 3 and 4 can operate at 128 Gbps if the ports are configured correctly.

FIG. 5 illustrates the embodiment of FIG. 4 with the inclusion of a patch panel 500. The use of the patch panel 500 adds increased flexibility in connecting FC ports but it also allows the introduction of improperly cabled situations. FIG. 5 illustrates the case where QSFP 28 transceiver 304 transmit lane 1 is connected to QSFP 28 transceiver 302 receive lane 2 and QSFP 28 transceiver 304 transmit lane 2 is connected to QSFP 28 transceiver 302 receive lane 1. Because of the lane nature of 128 Gbps FC, if lanes in the same transceiver are crossed, the receivers can re-order the lanes and resolve the patching error, assuming the lanes all otherwise meet the conventions according to the present invention.

Figure 6:
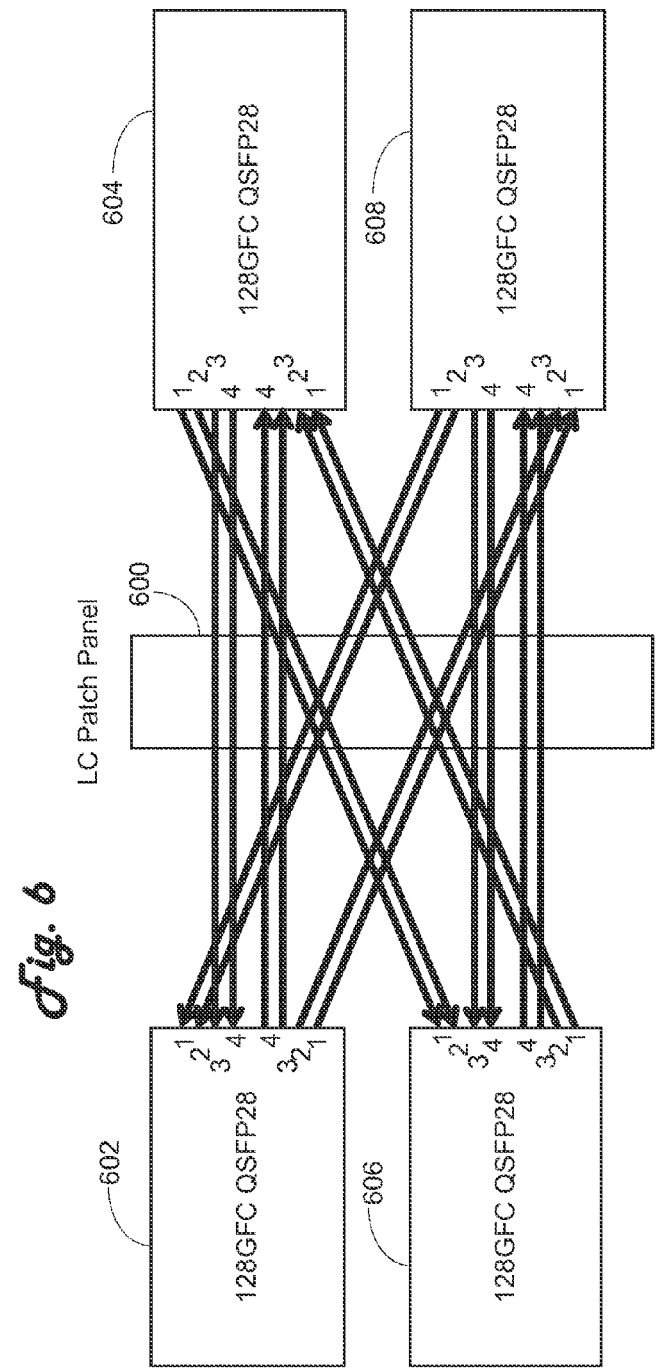
FIG. 6 is a block diagram of an alternative embodiment of FIG. 4.

FIG. 6 illustrates four QSFP 28 transceivers 602-608 and a patch panel boo. In the illustrated situation the lanes are highly improperly configured for 128 Gbps operation and actually will not operate at 128 Gbps. Two lanes of QSFP 28 transceiver 602 are connected to QSFP 28 transceiver 604 and two to QSFP 28 transceiver 608. The other two lanes of QSFP 28 transceiver 604 are connected to QSFP 28 transceiver 606. The remaining two lanes of QSFP 28 transceivers 606 and 608 are connected together. Because of the striping of the lanes in 128 Gbps, as described in the related U.S. patent application Ser. No. 14/308,143 entitled "128 Gigabit Fibre Channel Physical Architecture" application, CRC errors will result and 128 Gbps cannot be developed. However, if the lanes are configured to operate individually and not only to form a 128 Gbps link, then the configuration is operable, though at reduced overall throughput as then there are two 32 Gbps links between the various QSFP 28 transceivers.

Figure 7:
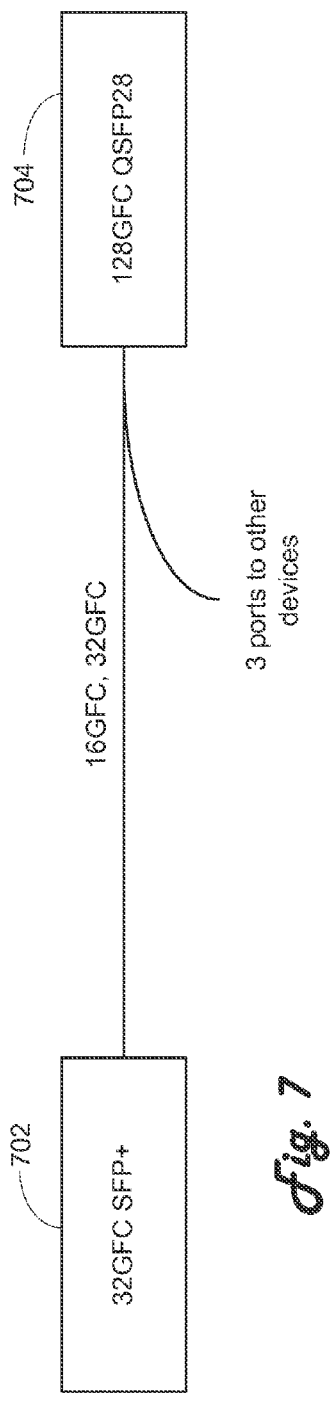
FIG. 7 is a block diagram of an alternative embodiment of FIG. 3.

FIG. 7 illustrates an alternative configuration. One lane of QSFP 28 transceiver 704 is connected to a 32 GFC SFP+ transceiver 702. The other three lanes of QSFP 28 transceiver 704 are similarly broken out to individual 32 GFC SFP+ transceivers. This configuration does not result in 128 Gbps operation but does allow 32 Gbps operation over the four ports of QSFP 28 transceiver 704 if the lanes can operate individually.

Figure 8:
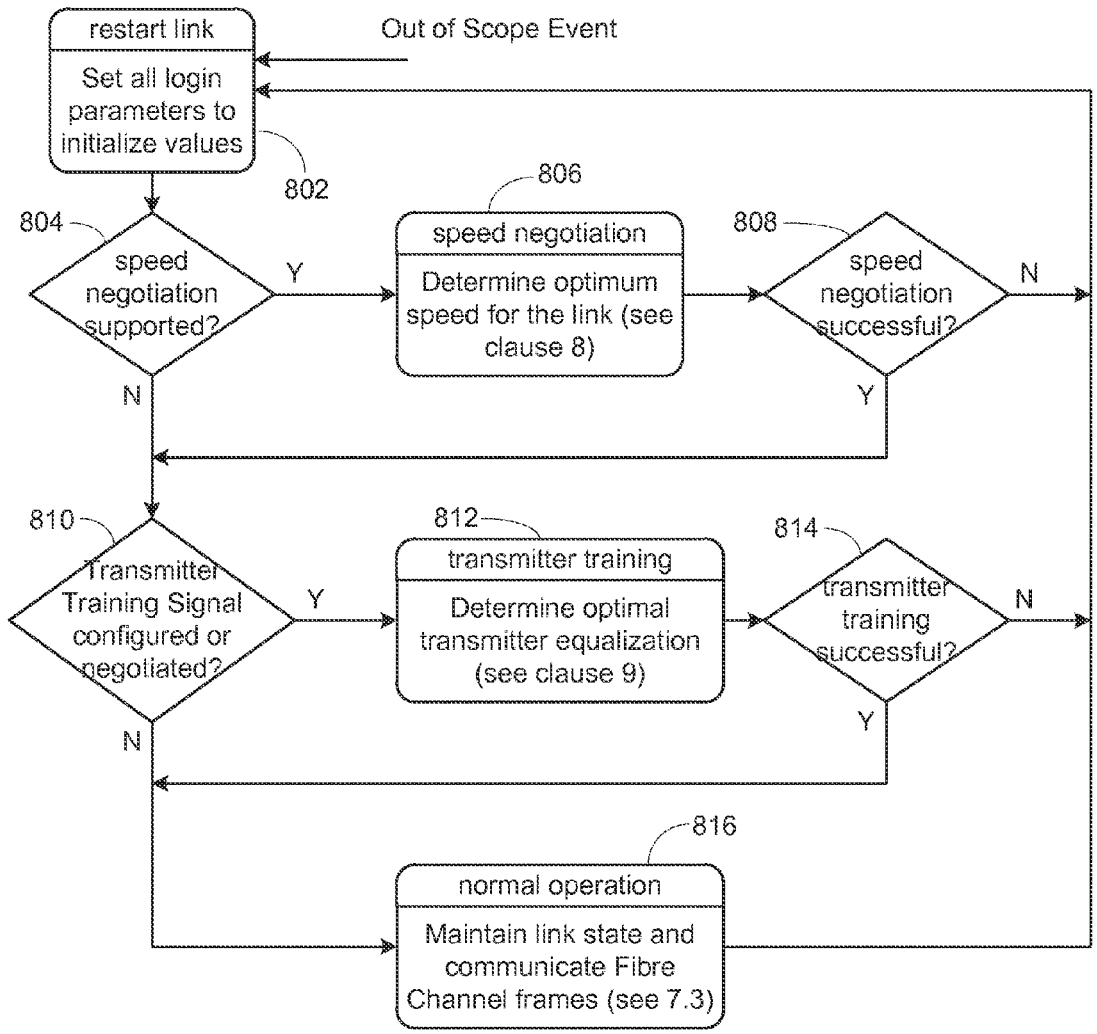
FIG. 8 is a port state machine according to the prior art.

The FC-FS-3 Rev. 1.11 specification dated Oct. 22, 2010, hereby incorporated by reference, defines a port state machine for starting or restarting a link. The state machine is provided in FIG. 8. In step 802 all login parameters are set to initialize values. In step 804 it is determined if speed negotiation is supported for the port. If so, in step 806 the optimum speed for the link is determined. In several cases, such as certain 16 Gbps or 32 Gbps configurations, speed negotiation is done using a transmitter training signal as discussed below. Step 808 determines if speed negotiation was successful. If not, then operation returns to step 802. If successful or if speed negotiation is not supported, next step 810 determines if transmitter training signal is configured or supported. If so, in step 812 transmitter training occurs to determine the optimal transmitter equalization. Step 814 then determines if the transmitter training was successful. If not, step 802 is the next step. If successful or if the transmitter training signal is not configured or negotiated, normal operation proceeds in step 816.

Figure 9:
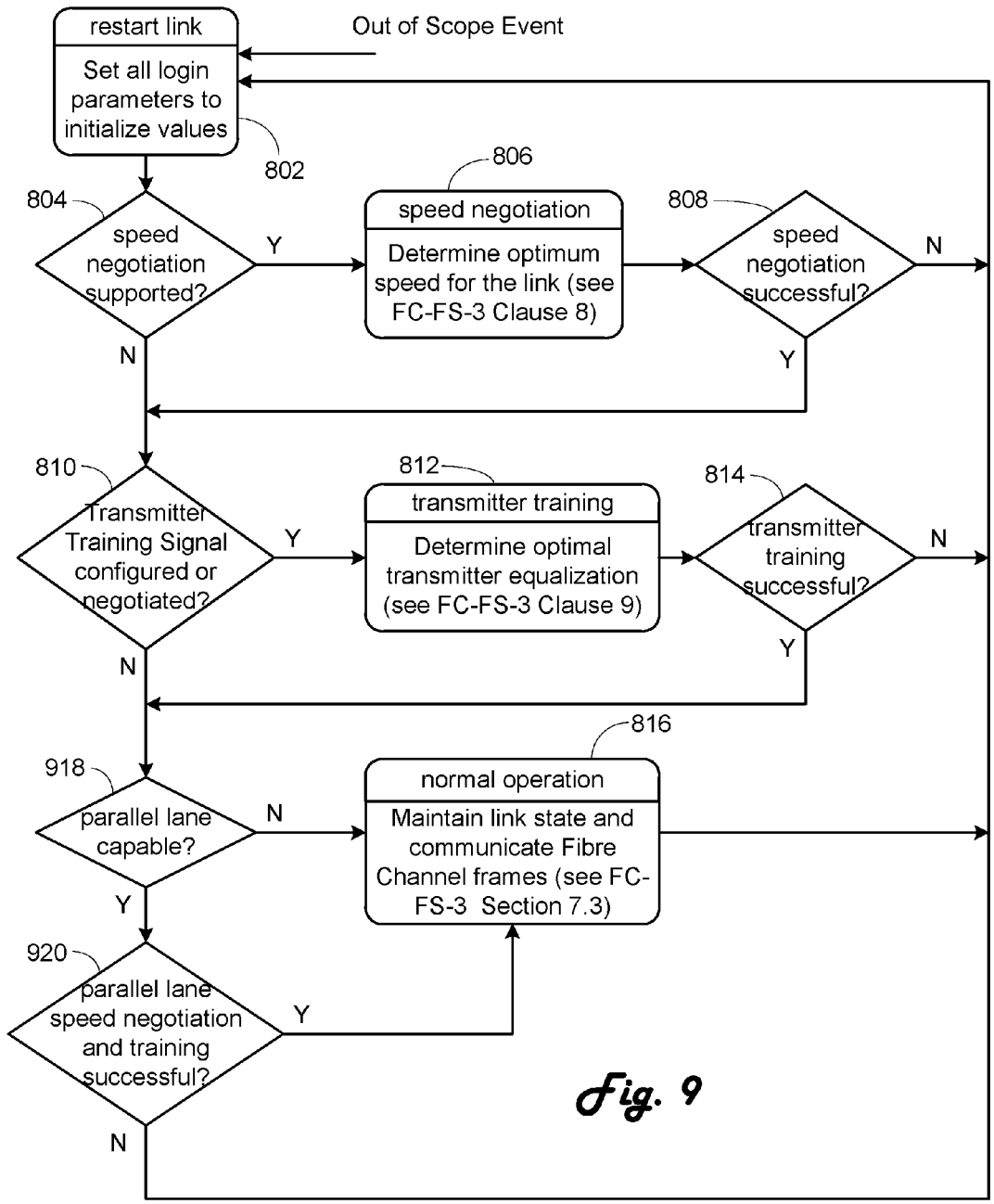
FIG. 9 is a port state machine according to the present invention.

FIG. 9 is a port state machine according to the present invention. Operation is as in the state machine of FIG. 8 until the steps after step 810 if the transmitter training signal is not configured or negotiated or if transmitter training was successful in step 814. Then instead of going directly to normal operation in step 816, step 918 is performed. Step 918 determines if the port is parallel lane capable. This information is obtained in the training frame control field, as shown in FIG. 11.

As indicated in Section 5.4 of the FC-FS-3 specification, training of the transmitters can be done using a combination of a training frame and a training pattern, together referred to as the transmitter training signal. The training frame itself has two portions, the control field and the status field. According to the preferred embodiments, a change is made to the control field to provide the parallel lane capability indication. Specifically, bit 10, which was previously a reserved bit, is used as the parallel lane support bit, a one value indicating parallel lane support and a zero value indicating only single lane operation. This is not to be confused with the port configuration of 128 Gbps only, independent only or either, but rather whether the port can do parallel lane operations, a precursor for 128 Gbps operation. By placing this indication in the training frame control field, the capability is known before step 920, when it is needed.

Figure 10:
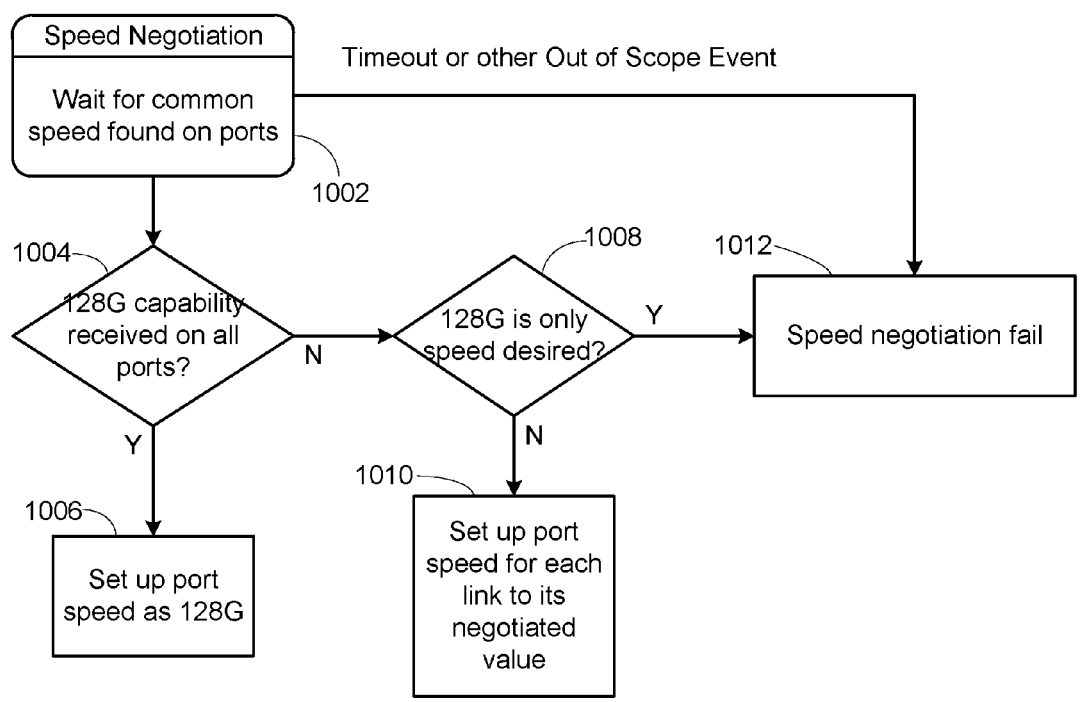
FIG. 10 is a state machine for determining 128 Gbps operation according to the present invention.

If not parallel capable, then normal operation in step 816 is performed, with each port operating at the negotiated speed. If the port is parallel lane capable, in step 920 a determination is made whether parallel lane speed negotiation and training were successful. This operation is detailed in FIG. 10 described below. If successful, operation proceeds to step 816 for normal operation. The speed for the port is provided as shown in FIG. 10. If not successful in step 920, operation returns to step 802.

FIG. 10 sets up 128 Gbps operation and is the operative portion of step 920. It commences with step 1002 by waiting for completion of speed negotiation and training on all four ports. When complete, in step 1004 a determination is made whether all four ports have indicated 128 Gbps capability. This means that the port has indicated it is a 32 Gbps port, has parallel lane capability, the port is set to either 128 Gbps operation or 128 Gbps or individual lane operation and the individual link speed negotiations and training have completed successfully. If all are true, in step 1006 the port speed is set as 128 Gbps and striping as described in the related U.S. patent application Ser. No. 14/308,143 entitled "128 Gigabit Fibre Channel Physical Architecture" can occur.

If 128 Gbps capability was not indicated on all four ports, i.e. at least one of the ports did not report true to each of the points above, then a determination is made in step 1008 whether the ports are set for 128 Gbps only operation. If not, then the port speed for each link is set to the value negotiated for the link in step 1010. Thus the four ports may all be operable but not at 32 Gbps or are not connected correctly, as discussed above. If in step 1008 128 Gbps is the only speed desired for the ports, then in step 1012 speed negotiation is indicated as a failure when operation proceeds in step 920.

Figure 12:
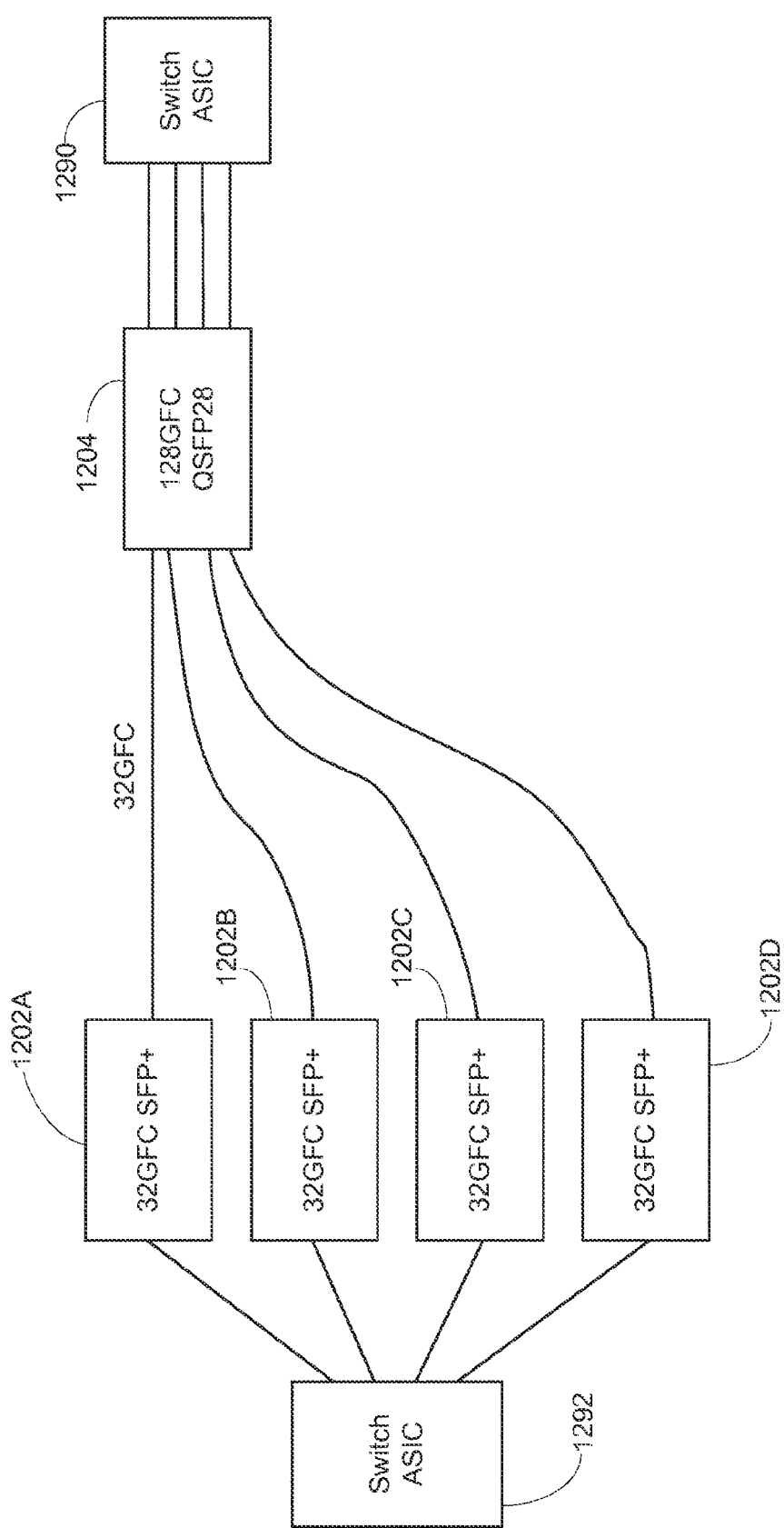
FIG. 12 is a block diagram of an alternate embodiment utilizing a quad transceiver and four individual transceivers according to the present invention.

The above discussion has focused on connecting two QSFP 28 transceivers to develop a 128 Gbps link. This is based in part that this most easily lends itself to developing the link as a quad link cable will be used so that link skews are minimized and that the four transceiver ports are most likely to be connected to four adjacent ports on the switch ASIC. However, this is not the only configuration that allows for development of a 128 Gbps link. Referring to FIG. 12, a QSFP 28 transceiver 1204 is connected to four adjacent ports on a switch ASIC 1290, such as the switch ASIC 195. This is as in the above configurations. Four 32 Gbps SFP+ transceivers 1202A-1202D are connected to the QSFP 28 transceiver 1204, each SFP+ transceiver connected to one lane of the QSFP 28 transceiver 1204. The four 32 Gbps SFP+ transceivers 1202A-1202D are then connected to adjacent ports on a switch ASIC 1290, again similar to switch ASIC 195. It is noted that the adjacency need not necessarily be physical adjacency but rather logical adjacency if the switch ASIC is able to group physically separated ports into a logical group of four for lane operations as described in the related U.S. patent application Ser. No. 14/308,143 entitled "128 Gigabit Fibre Channel Physical Architecture" to be performed. Thus there can be internal routing from the physical or PMA/PMD port to the PCS/RS FEC module.

Figure 13:
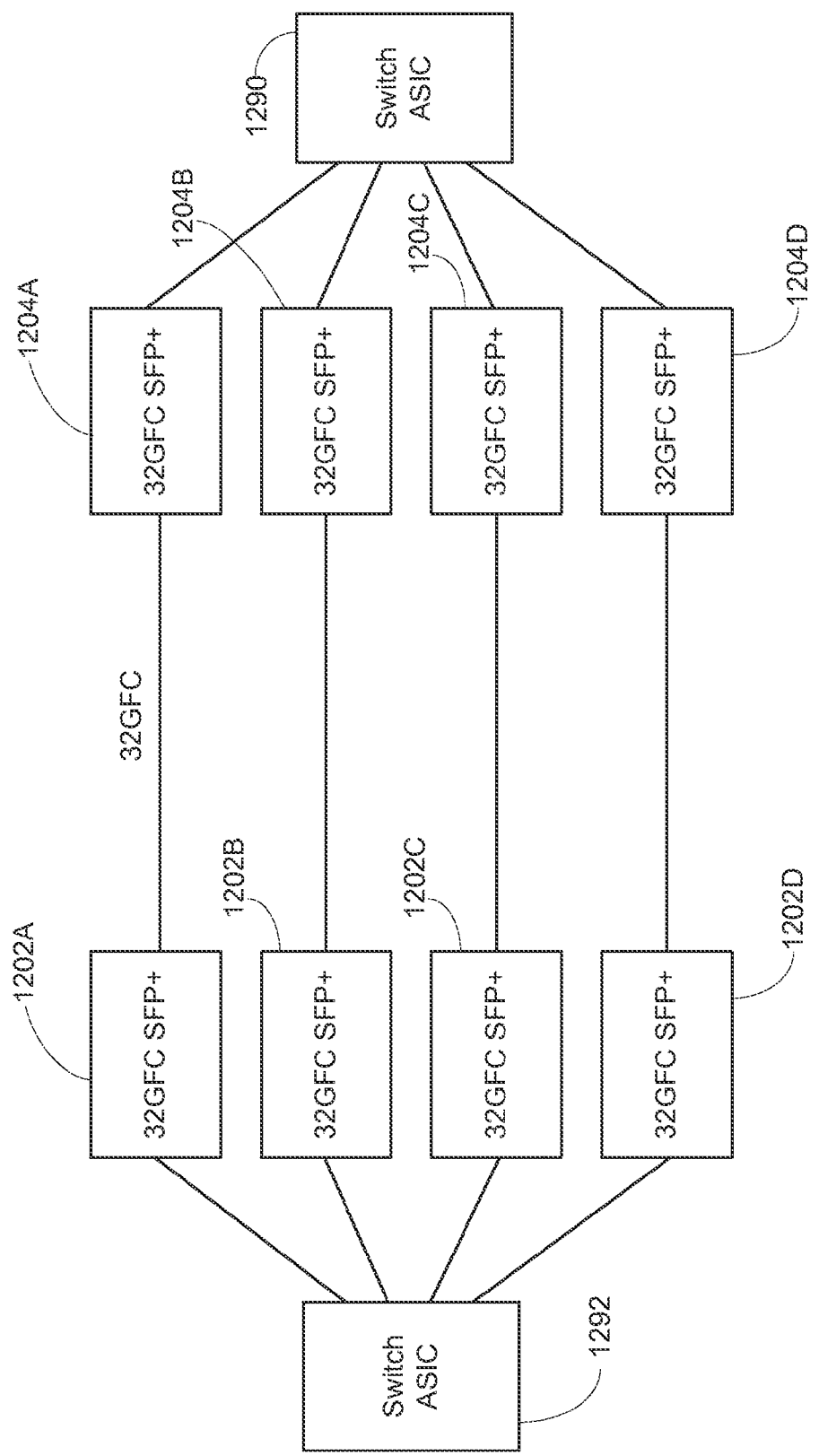
FIG. 13 is a block diagram of an alternate embodiment utilizing four individual transceivers in each switch according to the present invention.

FIG. 13 is similar to FIG. 12 except the QSFP 28 1204 has been replaced by four 32 Gbps SFP+ transceivers 1204A-1204D.

It is helpful to insure that the four ports are actually connected in parallel to minimize the occurrence of problems as shown in FIG. 6, which could occur without the use of a patch panel as now individual cables are being connected, rather than a quad cable used with a QSFP module. This can be done in several ways. A first way is to use circuitry similar to that used to time individual lane skews as disclosed in U.S. Pat. No. 7,447,198, so that four signals are transmitted from four candidate ports at the same time and then the receiving end can monitor for receipt of the signals on the four ports. If the four signals are received within allowable time skews, then the four lanes are indeed parallel and can be combined to make a 128 Gbps if all other conditions are met. Selection of the four ports for transmission or detection could be done based on switch configuration parameters where the four ports are designated as ports to be combined for a given 128 Gbps link. As a second option, when the individual ports are initialized, a method similar to that described in U.S. Pat. No. 8,700,799 can be used. As parallel links are between switches are detected, such as by examining remote switch worldwide name (WWN) values as the links are initialized, when all of the parallel links are determined, then sets of four links may be selected and configuration as a 128 Gbps link as described above can be performed. If the particular set of links is unsuccessful, then a different combination can be tried until success if achieved or all combinations have been tried. Other methods will be apparent to those skilled in the art.

Therefore with only minor changes to the standards documents and a few additional steps, 128 Gbps operation can be determined to be available and then used.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method comprising:
   performing speed negotiation and transmitter training independently on each of the ports at one end of four parallel connected Fibre Channel links, each port including an independent PHY;
   determining, after speed negotiation and transmitter training, if the ports at one end of each of the four parallel connected Fibre Channel links are capable of operating as parallel lanes;
   determining, after speed negotiation and transmitter training, if each of the ports at one end of the four parallel connected Fibre Channel links has indicated capability of 128 Gbps operation;
   determining, after speed negotiation and transmitter training, if each of the four parallel connected Fibre Channel links has independently negotiated for 32 Gbps operation; and
   configuring each of the ports at one end of the four parallel connected Fibre Channel links for 128 Gbps operation upon determining that the ports at one end of each of the four parallel connected Fibre Channel links are capable of operating as parallel lanes, that each of the ports at one end of each of the four parallel connected Fibre Channel links has indicated capability of 128 Gbps operation and that each of the four parallel connected Fibre Channel links has independently negotiated for 32 Gbps operation.

2. The method of claim 1, further comprising:
determining, after speed negotiation and transmitter training, if at least one of the ports at one end of the four parallel connected Fibre Channel links indicates 128 Gbps only operation; and
indicating speed negotiation failure upon determining that either one of the ports at one end of each of the four parallel connected Fibre Channel links is not capable of operating as a parallel lane or each of the four parallel connected Fibre Channel links has not negotiated for 32 Gbps operation and upon determining that at least one of the ports at one end of the four parallel connected Fibre Channel links indicates 128 Gbps only operation.

3. The method of claim 1, further comprising:
determining, after speed negotiation and transmitter training, if each of the ports at one end of the four parallel connected Fibre Channel links indicates 128 Gbps or independent operation; and
configuring each of the ports at one end of the four parallel connected Fibre Channel links for operation at its respective negotiated speed upon determining that either each of the ports at one end of the four parallel connected Fibre Channel links are not capable of operating as parallel lanes or each of the four parallel connected Fibre Channel links has not negotiated for 32 Gbps operation.

4. The method of claim 1, further comprising:
determining, after speed negotiation and transmitter training, if each of the ports at one end of the four parallel connected Fibre Channel links indicates independent only operation; and
configuring each of the ports at one end of the four parallel connected Fibre Channel links for operation at its respective negotiated speed even upon determining that each of the ports at one end of the four parallel connected Fibre Channel links are capable of operating as parallel lanes and that each of the four parallel connected Fibre Channel links has negotiated for 32 Gbps operation.

5. The method of claim 1, wherein each of the ports at one end of the four parallel connected Fibre Channel links are provided in a single quad small form-factor pluggable transceiver.

6. The method of claim 1, wherein each of the ports at one end of the four parallel connected Fibre Channel links are provided in individual small form-factor pluggable transceivers.

7. One or more non-transitory processor-readable storage media encoding computer-executable instructions for executing a method on a computer system, the method comprising:
performing speed negotiation and transmitter training independently on each of the ports at one end of four parallel connected Fibre Channel links, each port including an independent PHY;
determining, after speed negotiation and transmitter training, if the ports at one end of each of the four parallel connected Fibre Channel links are capable of operating as parallel lanes;
determining, after speed negotiation and transmitter training, if each of the ports at one end of the four parallel connected Fibre Channel links has indicated capability of 128 Gbps operation;
determining, after speed negotiation and transmitter training, if each of the four parallel connected Fibre Channel links has independently negotiated for 32 Gbps operation; and
configuring each of the ports at one end of the four parallel connected Fibre Channel links for 128 Gbps operation upon determining that the ports at one end of each of the four parallel connected Fibre Channel links are capable of operating as parallel lanes, that each of the ports at one end of each of the four parallel connected Fibre Channel links has indicated capability of 128 Gbps operation and that each of the four parallel connected Fibre Channel links has independently negotiated for 32 Gbps operation.

8. The one or more non-transitory processor-readable storage media of claim 7, the method further comprising:
determining, after speed negotiation and transmitter training, if at least one of the ports at one end of the four parallel connected Fibre Channel links indicates 128 Gbps only operation; and
indicating speed negotiation failure upon determining that either one of the ports at one end of each of the four parallel connected Fibre Channel links is not capable of operating as a parallel lane or each of the four parallel connected Fibre Channel links has not negotiated for 32 Gbps operation and upon determining that at least one of the ports at one end of the four parallel connected Fibre Channel links indicates 128 Gbps only operation.

9. The one or more non-transitory processor-readable storage media of claim 7, the method further comprising:
determining, after speed negotiation and transmitter training, if each of the ports at one end of the four parallel connected Fibre Channel links indicates 128 Gbps or independent operation; and
configuring each of the ports at one end of the four parallel connected Fibre Channel links for operation at its respective negotiated speed upon determining that either each of the ports at one end of the four parallel connected Fibre Channel links are not capable of operating as parallel lanes or each of the four parallel connected Fibre Channel links has not negotiated for 32 Gbps operation.

10. The one or more non-transitory processor-readable storage media of claim 7, the method further comprising:
determining, after speed negotiation and transmitter training, if each of the ports at one end of the four parallel connected Fibre Channel links indicates independent only operation; and
configuring each of the ports at one end of the four parallel connected Fibre Channel links for operation at its respective negotiated speed even upon determining that each of the ports at one end of the four parallel connected Fibre Channel links are capable of operating as parallel lanes and that each of the four parallel connected Fibre Channel links has negotiated for 32 Gbps operation.

11. The one or more non-transitory processor-readable storage media of claim 7, wherein each of the ports at one end of the four parallel connected Fibre Channel links are provided in a single quad small form-factor pluggable transceiver.

12. The one or more non-transitory processor-readable storage media of claim 7, wherein each of the ports at one end of the four parallel connected Fibre Channel links are provided in individual small form-factor pluggable transceivers.

13. An apparatus comprising:
four Fibre Channel ports for connection to four Fibre Channel links, each port including an independent PHY;

a processor coupled to each of said four Fibre Channel ports;

memory coupled to said processor and storing processor-executable instructions for executing a method comprising:

performing speed negotiation and transmitter training independently on each of said four Fibre Channel ports;

determining, after speed negotiation and transmitter training, if each of said four Fibre Channel ports are capable of operating as parallel lanes;

determining, after speed negotiation and transmitter training, if each of said four Fibre Channel ports has indicated capability of 128 Gbps operation;

determining, after speed negotiation and transmitter training, if each of the four Fibre Channel ports has independently negotiated for 32 Gbps operation; and configuring each of the four Fibre Channel ports for 128 Gbps operation upon determining that each of the four Fibre Channel ports are capable of operating as parallel lanes, that each of the four Fibre Channel ports has indicated capability of 128 Gbps operation and that each of the four Fibre Channel ports has independently negotiated for 32 Gbps operation.

14. The apparatus of claim 13, the method further comprising:

determining, after speed negotiation and transmitter training, if at least one of the four Fibre Channel ports indicates 128 Gbps only operation; and indicating speed negotiation failure upon determining that either one of the four Fibre Channel ports is not capable of operating as a parallel lane or each of the four Fibre Channel ports has not negotiated for 32 Gbps operation and upon determining that at least one of the four Fibre Channel ports indicates 128 Gbps only operation.

15. The apparatus of claim 13, the method further comprising:

determining, after speed negotiation and transmitter training, if each of the four Fibre Channel ports indicates 128 Gbps or independent operation; and configuring each of the four Fibre Channel ports for operation at its respective negotiated speed upon determining that either each of the four Fibre Channel ports are not capable of operating as parallel lanes or each of the four Fibre Channel ports has not negotiated for 32 Gbps operation.

16. The apparatus of claim 13, the method further comprising:

determining, after speed negotiation and transmitter training, if each of the four Fibre Channel ports indicates independent only operation; and configuring each of the four Fibre Channel ports for operation at its respective negotiated speed even upon determining that each of the four Fibre Channel ports are capable of operating as parallel lanes and that each of the four Fibre Channel ports has negotiated for 32 Gbps operation.

17. The apparatus of claim 13, wherein each of the four Fibre Channel ports are provided in a single quad small form-factor pluggable transceiver.

18. The apparatus of claim 13, wherein each of the four Fibre Channel ports are provided in individual small form-factor pluggable transceivers.

* * * * *